United States Patent [19]
Burns

[11] Patent Number: 5,666,848
[45] Date of Patent: Sep. 16, 1997

[54] DEVICE FOR CUTTING AND CRIMPING PIPES OR TUBES

[75] Inventor: Kevin John Burns, Cumbria, United Kingdom

[73] Assignee: British Nuclear Fuels plc, United Kingdom

[21] Appl. No.: 481,464

[22] PCT Filed: Nov. 4, 1994

[86] PCT No.: PCT/GB94/02429

§ 371 Date: Aug. 2, 1995

§ 102(e) Date: Aug. 2, 1995

[87] PCT Pub. No.: WO95/13160

PCT Pub. Date: May 18, 1995

[30] Foreign Application Priority Data

Nov. 10, 1993 [GB] United Kingdom ............ 9323212

[51] Int. Cl.6 ........................... B21D 28/20
[52] U.S. Cl. ............... 72/326; 72/367; 72/453.16; 72/453.02
[58] Field of Search ............... 72/325–328, 294, 72/367, 453.16, 453.07, 453.02; 29/890.14

[56] References Cited

U.S. PATENT DOCUMENTS 4,516,593 5/1985 Muto .......................... 72/367
4,790,168 12/1988 Vonthien ..................... 72/326

FOREIGN PATENT DOCUMENTS 25 45 200 5/1977 Germany.

Primary Examiner—Daniel C. Crane
Attorney, Agent, or Firm—Nixon & Vanderhye, P.C.

[57] ABSTRACT

A crimping and cutting device for use on pipes comprises a frame (1) provided at one end with an anvil (4) to locate a pipe (P) during a crimping and cutting operation. The device includes a crimping head (18) and a cutting blade (28) which are movable towards the anvil (4) by, respectively, first and second hydraulic actuators (11, 13). The two actuators are mounted coaxially on the frame (1), with the first actuator (11) being operatively connected to the second actuator (13). In operation, the first actuator (11) is operated to move the second actuator (13) which, in turn, moves the crimping head (18) so as to compress the pipe against the anvil (4). Then the second actuator (13) is operated to move the cutting blade (28) through a passage (35) formed in the crimping head (18) so that the blade cuts through the compressed region of the pipe (P).

9 Claims, 3 Drawing Sheets development# DEVICE FOR CUTTING AND CRIMPING PIPES OR TUBES This application is a 371 of PCT/GB94/02429, filed on Nov. 4, 1994.

BACKGROUND OF THE INVENTION

1. Field of the Invention

This invention relates to devices for cutting pipes or tubes, particularly, but not exclusively, pipes or tubes which have been used to convey hazardous material.

2. Discussion of Prior Art

When dismantling pipework which has been used to convey hazardous material, such as radioactive fluids used in the nuclear industry, it is desirable to put each pipe so that the two ends of the cut pipe are closed. This prevents the escape of any harmful contaminants that may be contained in the pipe.

It is known to sever pipes by means of a hydraulically-powered cutting tool which is provided with a crimping attachment designed to compress the pipe at the region to be cut. After compressing the pipe, the crimping attachment is removed and replaced by a cutting blade. The cutting blade is then operated to cut through the compressed region, leaving sealed pipe ends on either side of the cut to prevent the escape of contaminants.

A disadvantage with this known pipe cutting tool is the necessity to remove the crimping attachment and replace it with the cutting blade. This is particularly disadvantageous when cutting pipes in hazardous environments, such as a radioactive environment found in the nuclear industry, where it is necessary for the operative to wear protective clothing. During the exchange of the crimping attachment and cutting blade it is possible that one of these items could damage the protective clothing. It will be apparent that the leakage of harmful substances through the damaged clothing causes a threat to the health of the operative. Therefore, in addition to being a time consuming operation, the requirement to exchange the crimping attachment and cutting blade is very undesirable from a safety aspect.

SUMMARY OF THE INVENTION

It is an object of this invention to provide a pipe crimping and cutting device which overcomes the aforementioned disadvantage.

According to the invention there is provided a device for crimping and cutting a pipe or similar component, the device comprising a frame, means defined by the frame to provide an anvil for locating a pipe to be cut, crimping means mounted on said frame, said crimping means having a passage formed therein and being movable towards said anvil to produce a compressed region in a pipe located by the anvil, and a cutting blade adapted for movement through said passage towards the anvil so as to cut through the pipe at said compressed region.

Preferably, the crimping means and the cutting blade are each movable towards the anvil along the same axis.

The crimping means may be moved by operation of a first fluid-operated actuator and the cutting blade is moved by operation of a second fluid-operated actuator.

Advantageously, the first actuator and the second actuator are arranged coaxially on the frame.

Preferably, the second actuator is mounted between the first actuator and the anvil, the second actuator being operatively connected to the crimping means and the first actuator being operatively connected to the second actuator, whereby operation of the first actuator causes the second actuator to move the crimping means towards the anvil.

In a preferred embodiment the second actuator comprises a fluid-actuated piston operatively connected to the cutting blade.

The crimping means may comprise a generally cylindrical body having an end surface facing the anvil, the passage comprising a diametral rectangular slot extending into the crimping means from said end surface.

The passage preferably opens into a recess formed within the crimping means, the device further comprising blade fixture means to provide a connection between the piston of the second actuator and the cutting blade, the recess serving as a guideway for the blade fixture means.

The anvil preferably comprises two substantially parallel web portions separated by channel means, the arrangement being such that the channel means receives the cutting blade when said blade cuts through the pipe.

The frame may comprise a generally tubular body portion, each of said first and second actuators being arranged one behind the other within said body portion.

BRIEF DESCRIPTION OF THE DRAWINGS

Embodiments of the invention will now be described, by way of example, with reference to the accompanying drawings, in which.

DETAILED DISCUSSION OF PREFERRED EMBODIMENTS

Figure 1:
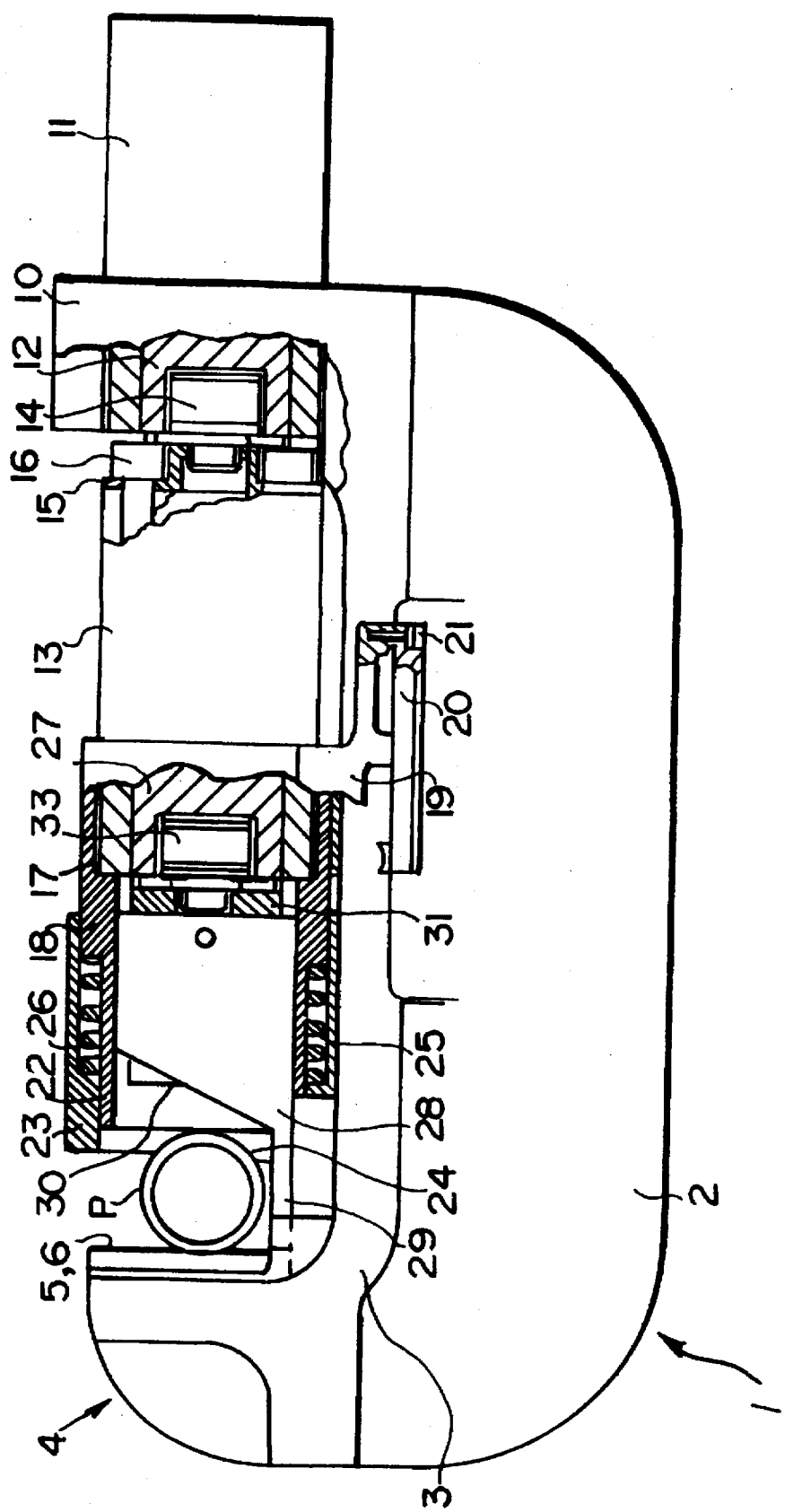
FIG. 1 is a part sectional front elevation of a crimping and cutting device according to a first aspect of the invention.
Figure 2:
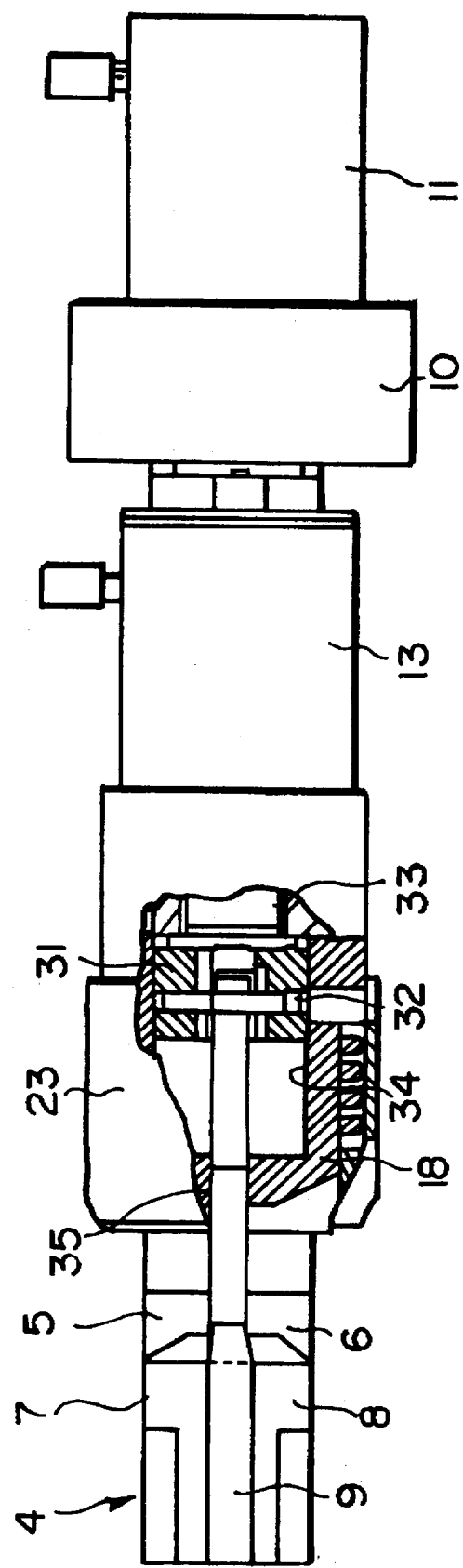
FIG. 2 is a part sectional plan view of the crimping and cutting device shown in FIG. 1.

Referring to FIGS. 1 and 2, a crimping and cutting device for severing pipes or tubes is shown and comprises a frame 1, which may be made from titanium. The frame 1 has a handle portion 2 and a bed 3 which is formed at one and into a fixed anvil 4. The anvil 4 has two hardened steel faces 5, 6 provided, respectively, on two parallel webs 7, 8 which are separated by a deep channel 9.

At the end opposite to that of the anvil 4, the frame 1 is formed into an annular boss 10 which has a screw-threaded bore to receive a correspondingly screw-threaded portion of a first fluid-operated actuator 11. The actuator 11 includes a piston 12 which is connected to a second fluid-operated actuator 13, which is co-axial with the first actuator 11, by a connector 14 and a connector plate 15, attached to the actuator 13 by screws 16. Preferably the actuators are hydraulic cylinder and piston assemblies operated by oil.

The forward end of the actuator 13 is housed within an internal recess 17 formed in a crimping head 18. The crimping head is mounted in a guide 19 which has a guide plate 20 fixed by screws 21 to its underside on both sides of the frame. In this region the frame bed 3 forms a guideway for the guide 19 and the guide plates 20. At the forward end of the crimping head 19 a reduced diameter spigot 22 is slidably arranged within a pipe locator 23. A cut-out portion 24 formed in the pipe locator 23 has converging sides extending from a front surface of the locator. A compression spring 25 is housed within the space formed between the outer surface of the spigot 22 and the inner surface of a recess 26 provided in the crimping head 18.

A piston 27 contained in the second actuator 13 operates a pipe cutting blade 29 of rectangular cross section and which has a forwardly projecting tongue 29 and a rearwardly inclined cutting surface 30. The blade 28 is connected to a blade fixture 31 which is attached to the piston 27 by means of a connector 33. A recess 34 formed in the crimping head 18 defines a guideway for the blade fixture 31 and a rectangular passage 35, extending into the recess from a front end surface of the crimping head, serves as a guide for the blade 28. The passage 35 is disposed so as to align with the anvil channel 9.

The crimping and cutting device operates as follows. A pipe or tube to be cut, indicated by letter F, is placed in the device so that it is located close to the faces 5, 6 of the anvil 4. A control button, not shown, incorporated in the handle 2 is depressed so as to initiate the operation of a hydraulic power pack of known type. Hydraulic oil from the power pack is supplied to the first actuator 11 thereby causing forward movement of the piston 12.

Movement of the piston 12 is transmitted through the connector plate 15 to the second actuator 13 which, in turn pushes the crimping head 18 towards the anvil faces 5, 6. Sliding movement of the crimping head 18 is guided by the guide 19 and guide plates 20 which move along the guideway formed on the bed 3 of the frame 1. Simultaneously, the pipe locator 23 is pushed forwardly by the actuator 13 acting through the crimping head 18 and the compression spring 25 until the pipe P locates in the cut-out portion 24. Continued forward movement of the piston 12 causes the crimping head 18 to slide through the pipe locator 23, thus compressing the spring 25. As a result the crimping head 18 compresses and flattens the pipe against the anvil faces 5, 6 so that a crimped region of about 5 cm length is formed along the pipe.

A pressure relief mechanism on the power pack is then actuated so that oil is bled to the second actuator 13, now stationary, thereby causing forward movement of the piston 27. This movement is transmitted through the connector 33 to the blade fixture 31 which moves forwardly along the recess 34. This causes the blade 28 to move through the passage 35 which guides the blade through the crimping head 18 so that the cutting surface 30 shears through the centre of the crimped region. During the cutting stroke, the channel 9 formed in the anvil 4 receives the tongue 29 and the cutting surface 30 of the blade 28.

On completion of the crimping and cutting operation a further control button, not shown, on the handle 1 is depressed so that the actuators 11, 13 return to their original position by the action of springs incorporated in the actuators.

Figure 3:
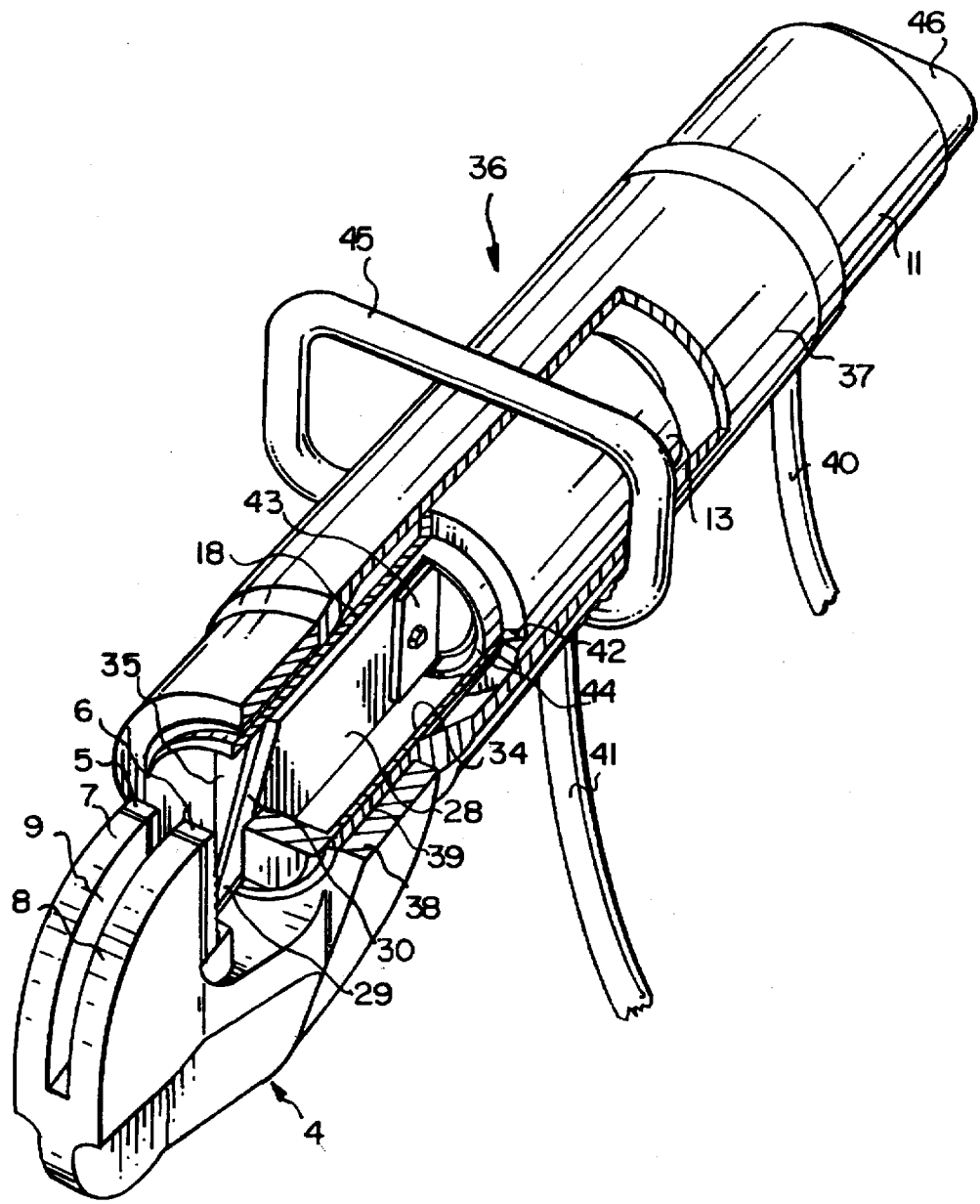
FIG. 3 is a part sectional isometric elevation of a crimping and cutting device according to a second aspect of the invention.

A further embodiment of the invention is illustrated in FIG. 3, in which the crimping and cutting device comprises a frame 36 formed from a generally tubular body 37 and an anvil portion 4. Suitably, the tubular body 37 may be made from aluminium and the anvil portion from titanium. The anvil portion 4 has a boss 38 which is bored to provide a seating for a reduced diameter spigot 39 formed at one end of the body 37. The anvil portion 4 has two parallel webs 7, 8 provided, respectively, with two hardened steel faces 5, 6 and separated by a deep channel 9.

At the rear end remote from the anvil portion 4 a first hydraulically-operated actuator 11 is fixedly mounted in the body 37 and has a piston operatively connected to a second hydraulically-operated actuator 13. The second hydraulically-operated actuator 13 is slidably mounted within the body 37. Hydraulic oil for operating the actuators 11, 13 is supplied through hoses 40, 41 respectively.

Slidably mounted within the front portion of the body 37 is a crimping head 18 which is connected to the forward end of the first actuator 13 by means of an outwardly turned flange 42. Extending into a front end surface of the crimping head 18 is a diametral rectangular passage 35 which is disposed in alignment with the channel 9 formed in the anvil portion 4. The passage 35 provides a guideway for the cutting blade 28 which is of rectangular cross section and attached to a piston of the first actuator 13 by means of a blade fixture 43. As in the embodiment described previously, the cutting blade 28 has a forwardly projecting tongue 29 and a rearwardly inclined cutting surface 30. The passage 35 opens into a recess 34 which seats on an annular spigot 44 projecting from the first actuator 13. A handle 45 is attached to the tubular body 37 at diametrically opposite sides thereof and a further handle 46 is provided at the rear of the second actuator 11.

Incorporated in each of the handles 45, 46 are control buttons (not shown) which are used to initiate, by means of an electronic control system (not shown), the operation of the first and second actuators 11, 13. The electronic control system is set so that the crimping force exerted on the pipe by the crimping head 18 has the desired magnitude, depending on the characteristics of the pipe being cut.

In operation, an operative grips a handle 45, 46 in each hand and manoeuvres the crimping and cutting device so that the pipe or tube to be cut is located close to the faces 5, 6 of the anvil portion 4. A control button on one of the handles is operated so as to initiate operation of the hydraulic power pack. Hydraulic oil from the power pack is transmitted through the hose 40 to the first actuator 11 thereby causing forward movement of the piston associated therewith.

Movement of this piston is transmitted to the second actuator 13 which moves forwardly along the inside of the body 37. As the second actuator 13 moves forwardly, it pushes the crimping head 18 through the spigot 39 towards the anvil faces 5, 6. Thus the crimping head 18 compresses and flattens the pipe against the anvil faces 5, 6 to form a crimped region along the pipe.

A pressure relief mechanism on the power pack is then actuated so that oil is supplied through the hose 41 to the second actuator 13. Thus, the piston associated with the actuator 13, now stationary, is operated so as to cause, by means of the blade fixture 43, forward movement of the cutting blade 28 through the passage 35. The passage 35 guides the blade 28 through the crimping head 18 so that the inclined cutting surface 30 shears through the centre of the crimped region of the pipe. As the blade 28 cuts through the pipe the tongue 29 and the cutting surface 30 move into the channel 9 formed in the anvil 4. After the pipe has been severed, a further control button on one of the handles 45, 46 is depressed so that the actuators 11, 13 are returned by their springs to their original positions.

The crimping and cutting steps take place consecutively and are completed within a time of 10–20 seconds, depending on the characteristics of the pipe.

The resulting severed pipe has closed ends on either side of the cut portion so that any harmful contaminants contained in the pipe are prevented from escaping.

The device is capable of crimping and cutting stainless steel pipes having, for example, nominal bores of up to one inch. It is constructed from materials having weights which enable the device to be handled and operated manually.

An advantage of the device is that pipes and tubes can be crimped and cut without the necessity of interchanging the crimping head and cutting blade, as is the case with known devices.

I claim:

1. A device for crimping and cutting a tubular component, the device comprising:

a frame, means defined by the frame to provide an anvil for locating said tubular component to be cut, crimping means mounted on said frame, said crimping means having a passage formed therein and being movable towards said anvil to produce a compressed region in the tubular component, and a cutting blade adapted for movement through said passage towards the anvil so as to cut through the tubular component at said compressed region wherein the crimping means is moved by operation of a first fluid-operated actuator and the cutting blade is moved by operation of a second fluid-operated actuator.

2. A device according to claim 1, wherein the crimping means and the cutting blade are each movable towards the anvil along the same axis.

3. A device according to claim 1, wherein the first actuator and the second actuator are arranged coaxially on the frame.

4. A device according to claim 1, wherein the said second actuator is mounted between the first actuator and the anvil, the second actuator being operatively connected to the crimping means and the first actuator being operatively connected to the second actuator, whereby operation of the first actuator causes the second actuator to move the crimping means towards the anvil.

5. A device according to claim 4, wherein the second actuator comprises a fluid-actuated piston operatively connected to the cutting blade.

6. A device according to claim 1, wherein the crimping means comprises a generally cylindrical body having an end surface facing the anvil the passage comprising a diametral rectangular slot extending into the crimping means from said end surface.

7. A device according to claim 6, wherein the passage opens into a recess formed within the crimping means, the device further comprising blade fixture means to provide a connection between the piston of said second actuator and the cutting blade, the recess serving as a guideway for said blade fixture means.

8. A device according to claim 1, wherein the anvil comprises two substantially parallel web portions separated by channel means, the arrangement being such that said channel means receives the cutting blade when said blade cuts through the pipe (P).

9. A device according to claim 1, wherein the frame comprises a generally tubular body portion each of said first and second actuators being arranged one behind the other within said body portion.

* * * * *

UNITED STATES PATENT AND TRADEMARK OFFICE
CERTIFICATE OF CORRECTION

PATENT NO. : 5,666,848
DATED : September 16, 1997
INVENTOR(S) : Burns

It is certified that error appears in the above-identified patent and that said letters patent is hereby corrected as shown below:

At Item [56] on the face of the patent, insert the following references:

| | | | |
|---|---|---|---|
| 2,670,524 | 3/1954 | Frank | 72/326 |
| 3,011,750 | 12/1961 | Johnson | 72/453.16 |
| 3,080,839 | 3/1963 | Fein | 72/326 |
| 4,014,201 | 3/1977 | Troutner | 72/367 |
| 4,150,556 | 4/1979 | Melnyk | 72/333 |

Column 3, line 5, "29" should be --28--.

Column 3, line 16, "F" should be --P--.

Signed and Sealed this

Ninth Day of December, 1997

*Attest:*

BRUCE LEHMAN

*Attesting Officer*     *Commissioner of Patents and Trademarks*